United States Patent
Zhang et al.

(10) Patent No.: US 10,206,144 B2
(45) Date of Patent: Feb. 12, 2019

(54) SCHEDULING BASED ON DATA TRAFFIC PATTERNS

(71) Applicant: Telefonaktiebolaget LM Ericsson (publ), Stockholm (SE)

(72) Inventors: Shunliang Zhang, Beijing (CN); Yi Wu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/121,445

(22) PCT Filed: Mar. 4, 2014

(86) PCT No.: PCT/CN2014/072781
§ 371 (c)(1),
(2) Date: Aug. 25, 2016

(87) PCT Pub. No.: WO2015/131305
PCT Pub. Date: Sep. 11, 2015

(65) Prior Publication Data
US 2017/0041828 A1     Feb. 9, 2017

(51) Int. Cl.
*H04W 28/16*     (2009.01)
*H04L 12/891*     (2013.01)
(Continued)

(52) U.S. Cl.
CPC ............. *H04W 28/16* (2013.01); *H04L 47/20* (2013.01); *H04L 47/41* (2013.01); *H04L 67/04* (2013.01);
(Continued)

(58) Field of Classification Search
CPC ...... H04W 28/16; H04W 88/02; H04L 47/41; H04L 47/20; H04L 67/22; H04L 67/125; H04L 67/04; H04L 67/32
See application file for complete search history.

(56) References Cited

U.S. PATENT DOCUMENTS

2006/0153119 A1*   7/2006   Ramanna ............. H04W 28/18
                                                          370/328
2009/0003282 A1*   1/2009   Meylan .................. H04L 47/10
                                                          370/331
(Continued)

FOREIGN PATENT DOCUMENTS

CN         101272600 A      9/2008
CN         102308614 A      1/2012
(Continued)

*Primary Examiner* — Lakeram Jangbahadur
(74) *Attorney, Agent, or Firm* — Coats & Bennett, PLLC

(57) ABSTRACT

This disclosure relates to radio communication. In particular, this disclosure relates to methods and means (e.g. a Core Network (CN) node) for assisting a RAN node (e.g. eNB) in performing Semi Persistent Scheduling (SPS). According to an example embodiment, the CN node is operative to: monitor (101) data traffic pertaining to a UE; determining (102) a traffic pattern based on the monitored data traffic; classify (103) the determined traffic pattern into different categories based on the determined traffic pattern; establish (104) a traffic shaping policy for each category of the different categories; and initiate (105A/105B) a dedicated bearer establishment for thereby enforcing the established traffic shaping policy.

27 Claims, 7 Drawing Sheets

(51) Int. Cl.
*H04L 12/813* (2013.01)
*H04L 29/08* (2006.01)
*H04W 88/02* (2009.01)

(52) U.S. Cl.
CPC ............ H04L 67/125 (2013.01); H04L 67/22 (2013.01); H04L 67/32 (2013.01); H04W 88/02 (2013.01)

(56) References Cited

U.S. PATENT DOCUMENTS

2014/0112146 A1* 4/2014 Hu .................. H04W 28/18
370/235
2014/0153391 A1* 6/2014 Ludwig ............... H04L 41/0816
370/230

FOREIGN PATENT DOCUMENTS

| CN | 103096180 A | 5/2013 |
| NO | 2012175123 A1 | 12/2012 |
| WO | 2006068739 A2 | 6/2006 |
| WO | 2008137959 A2 | 11/2008 |

* cited by examiner

SCHEDULING BASED ON DATA TRAFFIC PATTERNS

TECHNICAL FIELD

The present disclosure generally relates to radio communication. In particular, this disclosure relates to methods and means (e.g. a Core Network (CN) node) for assisting a Radio Access Network (RAN) node in performing Semi Persistent Scheduling (SPS).

BACKGROUND

Radio communication networks are widely deployed to provide various communication services such as telephony, video, data, messaging, broadcasts, and so on. Such radio communication networks support communications for multiple wireless communication devices (sometimes interchangeably referred to as User Equipments (UEs) herein) by sharing the available network resources. One example of such a network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). The complete network is called Evolved packet System (EPS) and is illustrated in FIG. 1. The radio access network is generally referred to as the E-UTRAN and the Core Network (CN) is generally referred to as the Evolved Packet Core (EPC). As is known among persons skilled in the art and as is shown in FIG. 1, the E-UTRAN may comprise evolved NodeB's (eNB). Also, the EPC may comprise various CN nodes, such as a Mobility Management Entity (MME), a Home Subscriber Server (HSS), a Serving GPRS Support Node (SGSN), a Serving Gateway (SGW), a Packet Data Network Gateway (PDN GW, or P-GW), a Policy and Charging Rules Function (PCRF), etc.

As radio communication networks evolve towards broadband networks, various emerging applications (APPs) are competing for radio resources with traditional voice and data applications. The emerging broadband applications may include voice over Internet protocol (VoIP) applications, high-definition television (HDTV), video-on-demand (VOD), streaming audio and video, machine-to-machine (M2M), instant messaging, presence services, etc. As has been realized by the inventors, the introduction of these emerging applications (APPs), such as smartphone APPs, may not be efficiently supported by the radio resources of radio communication networks. In contrast to traditional voice and data applications, the emerging smartphone APPs present different traffic patterns. For example, when using social networking APPs like FACEBOOK, TWITTER, WEIBO, WEIXIN, etc., the users typically like to share almost anything at any time and at any place. Thus, data traffic related to such emerging APPs may have different characteristics as compared with traditional voice and data applications. As is realized by the inventors, data traffic related to these emerging APPs typically, but not necessarily, exhibit a periodical or near periodical traffic pattern. Also, the distribution of small data packets (compared with comparatively larger data packets) may be higher than in traditional voice and data applications. Moreover, the data packet rate may e.g. be higher or lower than in traditional voice and data applications. In view of this trend, the inventors have further realized that the current traffic model of radio communication networks may have to undergo changes as the emerging APPs are introduced, since existing radio communication networks are not always designed for the data traffic patterns of the emerging APPs.

SUMMARY

It is in view of these considerations and others that the various embodiments of this disclosure have been. It is a general object of the embodiments disclosed herein to enable radio communication networks to support emerging applications (APPs). This general object and others are thus addressed by the embodiments defined in the appended claims.

In accordance with one aspect disclosed herein, a method performed by a Core Network node (CN node) for assisting a Radio Access Network node (RAN node) in performing a Semi Persistent Scheduling (SPS) is provided. Data traffic (e.g., packet data traffic) pertaining to a UE is monitored. Based on the monitored data traffic, a traffic pattern for the UE is determined. The determined traffic pattern is classified into different categories based on the periodicity of the determined traffic pattern. Also, a traffic shaping policy for each category is established. Finally, a dedicated bearer establishment is initiated for enforcing the established traffic shaping policy For example, monitoring the data traffic pertaining to the UE may involve identifying data traffic related to applications (APPs) that are in use by the UE. Also, determining the traffic pattern for the UE may involve analyzing whether identified data traffic related to the APPs exhibit a periodical or near periodical traffic pattern. In some embodiments, Deep Packet Inspection (DPI) may be utilized when identifying data traffic related to APPs in use by the UE and when analyzing whether identified data traffic related to the APPs exhibit a periodical or near periodical traffic pattern.

In some embodiments, classifying the determined traffic pattern into different categories based on the periodicity of the determined traffic pattern may comprise classifying the determined traffic pattern for the identified data traffic related to each of the APPs in use by the UE as one of periodical traffic pattern, near periodical traffic pattern or non-periodical traffic pattern. Furthermore, establishing the traffic shaping policy may advantageously, but not necessarily, comprise: determining whether identified data traffic related to a first APP in use by the UE is classified as periodical or near periodical traffic; determining whether identified data traffic related to a second APP in use by the UE is also classified as periodical or near periodical traffic; and aggregating (or synchronizing) the identified data traffics to obtain an aggregated periodical traffic pattern when it has been determined that both the identified data traffic related to said first APP in use by the UE is classified as periodical or near periodical traffic and the identified data traffic related to said second APP in use by the UE are classified as periodical or near periodical traffic.

Furthermore, initiating the dedicated bearer establishment for enforcing the established traffic shaping policy may further comprise transmitting a message comprising either a request for a bearer creation or a request for a bearer modification to a Serving Gateway (SGW). Said message may carry the obtained aggregated periodical traffic pattern. Said message may additionally comprise any information that is necessary, important, or otherwise suitable for the RAN node when performing its Semi Persistent Scheduling (SPS). This information may e.g. include traffic shaping policy parameters such as a specific Quality of Service Class Identifier (QCI) parameter, a dedicated SPS scheduling parameter, etc.

In accordance with another aspect disclosed herein, there is provided a CN node which is configured to perform the method described hereinabove. That is, the CN node for assisting the RAN node in performing SPS may comprise means adapted to monitor data traffic pertaining to a UE, means adapted to determine a traffic pattern for the UE based on the monitored data traffic, means adapted to classify the determined traffic pattern into different categories based on the periodicity of the determined traffic pattern, means adapted to establish a traffic shaping policy for each category, and means adapted to initiate a dedicated bearer establishment for enforcing the established traffic shaping policy.

In accordance with still another aspect disclosed herein, a method performed by a PDN GW for assisting a RAN node in performing SPS is provided. Data traffic (e.g., packet data traffic) pertaining to a UE is monitored. Based on the monitored data traffic, a traffic pattern for the UE is determined. The determined traffic pattern is classified into different categories based on the periodicity of the determined traffic pattern. In response to the determined traffic pattern being classified as periodical or near periodical traffic pattern a message is transmitted to a PCRF node for requesting the PCRF node to establish a traffic shaping policy. Subsequently, a response message including traffic shaping policy parameters for use by the PDN GW can be received. In response to receiving the response message including said traffic shaping policy parameters, a dedicated bearer establishment or modification is initiated such that the traffic shaping policy established by the PCRF node may be enforced by utilizing said traffic shaping policy parameters.

For example, monitoring the data traffic pertaining to the UE may comprise identifying data traffic related to APPs in use by the UE. Also, determining the traffic pattern for the UE may comprise analyzing whether identified data traffic related to the APPs exhibit a periodical or near periodical traffic pattern. In some embodiments, DPI may be utilized when identifying data traffic related to APPs in use by the UE and when analyzing whether identified data traffic related to the APPs exhibit a periodical or near periodical traffic pattern.

Furthermore, classifying the determined traffic pattern into different categories based on the periodicity of the determined traffic pattern may comprise classifying the determined traffic pattern for the identified data traffic related to each of the APPs in use by the UE as one of periodical traffic pattern, near periodical traffic pattern or non-periodical traffic pattern.

The method may additionally comprise aggregating (or, synchronizing) the identified data traffics to obtain an aggregated periodical traffic when it has been determined by the PCRF node that both the identified data traffic related to a first APP in use by the UE is classified as periodical or near periodical traffic and the identified data traffic related to a second APP in use by the UE are classified as periodical or near periodical traffic.

Furthermore, initiating a dedicated bearer establishment for enforcing the established traffic shaping policy may further comprise transmitting a message comprising either a request for a bearer creation or a request for a bearer modification to a SGW. Said message may carry the obtained aggregated periodical traffic pattern. Said message may additionally comprise any information that is necessary, important, or suitable for the RAN node when performing a Semi Persistent Scheduling (SPS). This information may e.g. include traffic shaping policy parameters such as a specific Quality of Service Class Identifier (QCI) parameter, a dedicated SPS scheduling parameter, etc.

In accordance with yet another aspect disclosed herein, there is provided a PDN GW which is configured to perform the method described hereinabove. That is, the PDN GW may comprise: means adapted to monitor data traffic pertaining to a UE, means adapted to determine a traffic pattern for the UE based on the monitored data traffic, means adapted to classify the determined traffic pattern into different categories based on the periodicity of the determined traffic pattern, means adapted to transmit a message to a PCRF node for requesting the PCRF node to establish a traffic shaping policy when the determined traffic pattern is classified as periodical or near periodical traffic pattern, means adapted to receive, from the PCRF node, a response message including traffic shaping policy parameters related to the established traffic shaping policy for use by the PDN GW, and means adapted to initiate a dedicated bearer establishment for enforcing the traffic shaping policy established by the PCRF node by utilizing said traffic shaping policy parameters in response to receiving the response message including said traffic shaping policy parameters.

In accordance with a further aspect disclosed herein, a method performed by a PCRF node for assisting a RAN node in performing SPS is provided. A message is received from a PDN GW, wherein said message requests the PCRF node to establish a traffic shaping policy. In response to receiving said message, a traffic shaping policy is established. A response message is thereafter transmitted to the PDN GW, wherein the response message including traffic shaping policy parameters related to the established traffic shaping policy for subsequent use by the PDN GW.

For instance, establishing the traffic shaping policy may comprise determining whether identified data traffic related to a first APP in use by the UE is classified as periodical or near periodical traffic, and determining whether identified data traffic related to a second APP in use by the UE is also classified as periodical or near periodical traffic.

In accordance with still another aspect disclosed herein, there is provided a PCRF node configured to perform the above-mentioned method. That is, the PCRF node may comprise means adapted to receive a message from a Packet Data Network Gateway, PDN GW, requesting the PCRF node to establish a traffic shaping policy; means adapted to establish a traffic shaping policy in response to receiving said message from the PDN GW; and means adapted to transmit, to the PDN GW, a response message including traffic shaping policy parameters related to the established traffic shaping policy for subsequent use by the PDN GW.

In accordance with still a further aspect, a computer program is provided. The computer program comprising instructions which, when executed on at least one processor of at least one apparatus causes the at least one apparatus to: monitor data traffic pertaining to a UE; determine a traffic pattern for the UE based on the monitored data traffic; classify the determined traffic pattern into different categories based on the periodicity of the determined traffic pattern; establish a traffic shaping policy for each category; and initiate a dedicated bearer establishment for enforcing the established traffic shaping policy. A carrier comprising the computer program may also be provided. The carrier may be any one of an electronic signal, an optical signal, a radio signal, or a computer readable storage medium.

Embodiments described herein provide the advantage that they may enable radio communication networks to support emerging APPs more efficiently than existing radio communication networks.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps (or actions) throughout the description.

Figure 1:
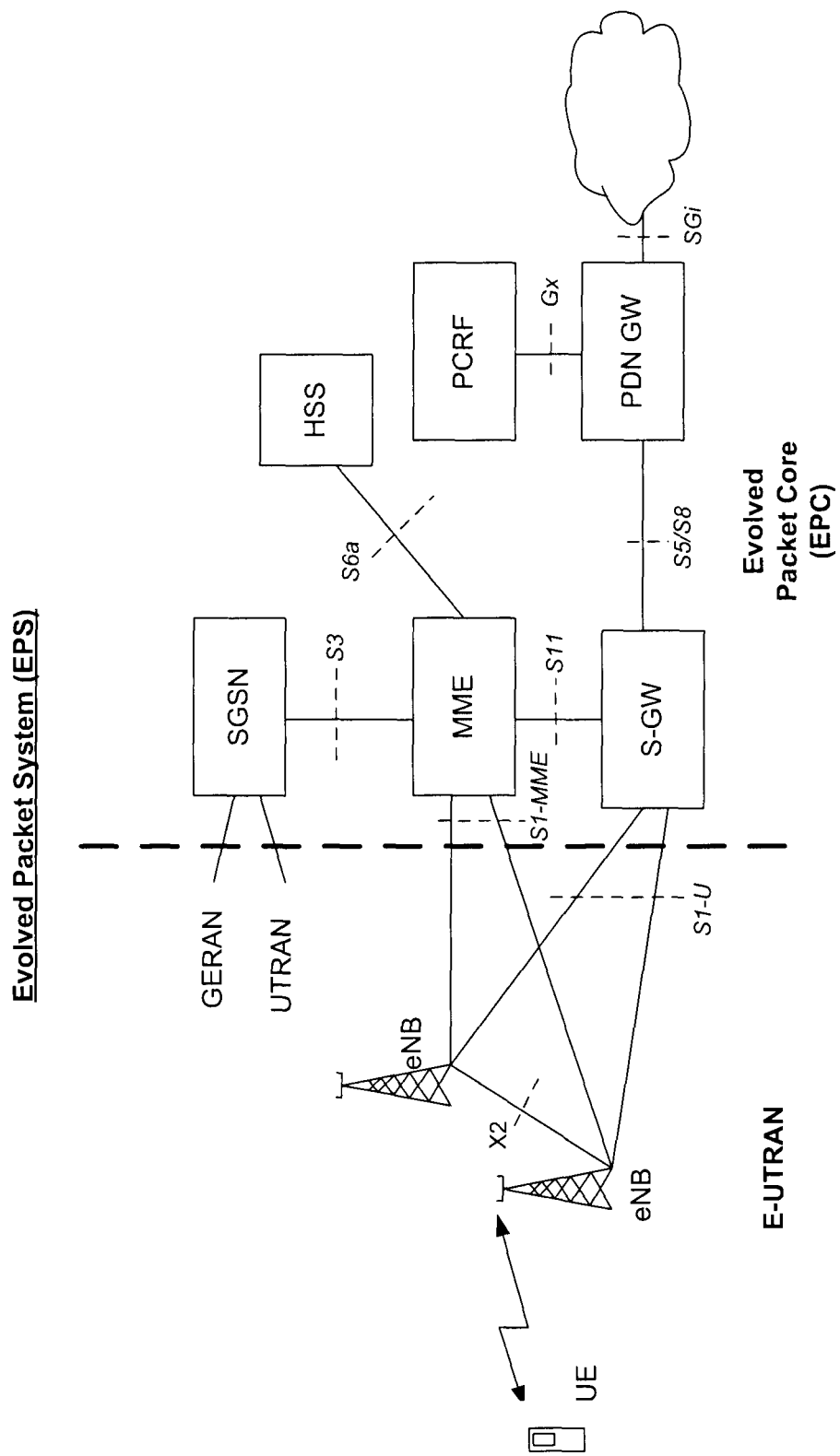
FIG. 1 shows an example of an EPS including the E-UTRAN and the EPC.

Methods, systems, CN nodes and RAN nodes described herein may enable a radio communication network (e.g. the EPS of FIG. 1) to support emerging APPs more efficiently than existing radio communication networks. In one of its aspects, the embodiments presented herein concerns assisting a RAN node in SPS by taking data traffic patterns of emerging APPs into account. SPS is, as such, known to persons skilled in the art and will therefore not be detailed herein.

Figure 2:
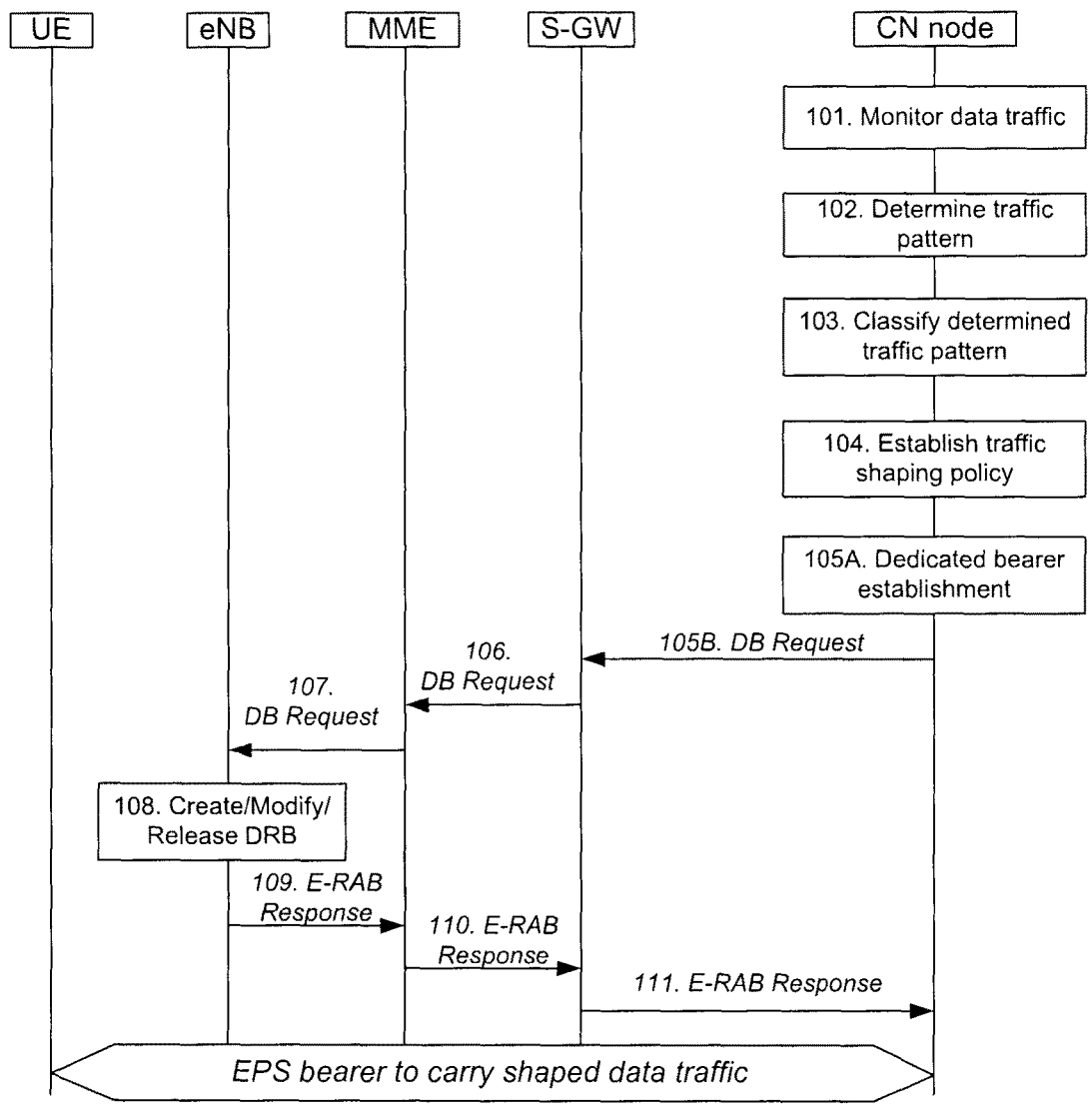
FIG. 2 shows an example signaling diagram of message sequences between various EPS nodes in accordance with an embodiment.

With reference to FIG. 2, a first embodiment will be described in more detail.

Action 101

A CN node monitors data traffic pertaining to a UE. This action may, e.g., involve identifying data traffic related to one ore more applications (APPs) that are in use by the UE.

Action 102

The CN node determines a traffic pattern for the UE based on the monitored data traffic. Thus, the determined traffic pattern is associated with the data traffic pertaining to the UE. In other words, the determined traffic pattern may be associated with identified data traffic that is related to the APP(s) that is/are in use by the UE.

This action may comprise analyzing whether identified data traffic related to the APPs exhibits a periodical or near periodical traffic pattern. Analyzing whether the data traffic related to the APPs exhibit a periodical or near periodical traffic pattern may in turn comprise analyzing the periodicity of the traffic exchange of the UE. The periodicity of traffic exchange may for example be defined as the data packet rate, e.g. the number of data packets transmitted and/or received by the UE in a particular number of seconds. Yet further, this action may comprise analyzing the packet size of the data packets transmitted and/or received by the UE. This action may thus also comprise analyzing an aggregated total data packet size transmitted and/or received by the UE. Moreover, this action may involve analyzing the number of small packets, i.e. the number of data packets having a packet size that is below a first pre-defined threshold size. Still further, this action may involve analyzing the distribution of packet sizes, i.e. the number of small packets compared with the number of large packets (wherein a large packet is defined as a data packet having a packet size that is above a second pre-defined threshold size).

In case both uplink (UL) and downlink (DL) traffic are analyzed in action 102, UL and DL traffic could be handled (thus, analyzed) separately.

Advantageously, but not necessarily, actions 101 and 102 described hereinabove may involve utilizing DPI. In other words, DPI may be utilized when identifying data traffic related to APPs in use by the UE and when analyzing whether identified data traffic related to the APPs exhibit a periodical or near periodical traffic pattern. DPI is, as such, known to persons skilled in the art and will therefore not be further detailed herein.

Action 103

The CN node classifies the determined traffic pattern into different categories based on the periodicity of the determined traffic pattern. For example, classifying the determined traffic pattern for the identified data traffic related to each of the APPs in use by the UE may be classified as one of periodical traffic pattern, near periodical traffic pattern or non-periodical traffic pattern.

In some embodiments, the CN node classifies the determined traffic pattern into different categories based on the earlier-mentioned data packet rate (e.g. the number of data packets transmitted and/or received by the UE in a particular number of seconds). In other words, depending on the determined data packet rate the determined traffic pattern may be classified as one of periodical traffic pattern, near periodical traffic pattern or non-periodical traffic pattern. Additionally, or alternatively, action 103 may classify the determined traffic pattern into the different categories based one or more of the following: packet size, aggregated total packet size, distribution of packet sizes as described hereinabove with respect to action 102.

The inventors have realized that certain APPs, such as smartphone APPs, exhibit characteristics in terms of periodicity, packet size, aggregated total packet size, distribution of packet sizes, etc., that would mean that the traffic pattern of such APPs would be classified as either periodical, or near periodical, according to the embodiments described herein. In other words, these APPs would generally not be classified as non-periodical.

Action 104

The CN node establishes a traffic shaping policy based on the classification performed in action 103. As used herein, traffic shaping refers to the procedure of shaping traffic based on the determined traffic patters.

Action 104 advantageously comprises determining whether identified data traffic related to a first APP (e.g. APP A) in use by the UE is classified as periodical or near periodical traffic and also determining whether identified data traffic related to a second APP (e.g. APP B) in use by the UE is also classified as periodical or near periodical traffic. Furthermore, when it has been determined that both the identified data traffic related to said first APP (APP A) in use by the UE is classified as periodical or near periodical traffic and the identified data traffic related to said second APP (APP B) in use by the UE are classified as periodical or near periodical traffic, then the identified data traffics are aggregated, or synchronized, such that an aggregated periodical (or near periodical) traffic pattern (APP A+APP B) is obtained. Thus, periodic data traffic of APP A may be aggregated with periodic data traffic of APP B to obtain an aggregated period traffic of APPs A+B. By aggregating the data traffic of two (or more) APPs that all exhibit periodical, or near periodical, traffic pattern one single periodical, or near periodical, data traffic pattern may be obtained. As will be further explained hereinbelow, this may allow for certain advantages.

The action of establishing the traffic shaping policy may also involve taking various parameters into account, such as Quality of Service parameters of the respective APPs (e.g., maximum delay, jitter tolerance). Thus, if necessary or appropriate, the data traffics of the various APPs may be adjusted or otherwise aligned such that it is made possible to obtain an aggregated periodical (or near periodical) traffic pattern.

Action 105

The CN node initiates a dedicated bearer establishment 105A. The dedicated bearer establishment 105A typically comprises establishing a traffic mapping policy. That is, the obtained aggregated periodical (or near periodical) traffic pattern of action 104 is mapped into a dedicated bearer. Thus, as used herein the term traffic mapping refers to the procedure of mapping the obtained aggregated periodical (or near periodical) traffic pattern to a specific, or dedicated, bearer.

Initiating the dedicated bearer establishment may further comprise transmitting 105B a message comprising either a request for a bearer creation or a request for a bearer modification to a Serving Gateway (SGW). This message may carry the obtained aggregated periodical (or near periodical) traffic pattern. Said message may additionally comprise any information that is necessary, important, or otherwise suitable for the evolved Node B (eNB) when performing SPS. This information may e.g. include traffic shaping policy parameters such as a specific Quality of Service Class Identifier (QCI) parameter, a dedicated SPS scheduling parameter, a parameter indicating the periodicity of the obtained aggregated data traffic, data traffic size, etcetera.

Consequently, if no existing bearer exists that can carry the obtained aggregated periodical (or near periodical) traffic pattern then the CN node initiates a dedicated bearer creation process by sending a Create Bearer Request message to the SGW. The Create Bearer Request message may additionally comprise any information that is necessary, important, or otherwise suitable for creating the bearer. As described hereinabove, this information may e.g. include traffic shaping policy parameters such as a specific Quality of Service Class Identifier (QCI) parameter, a dedicated SPS scheduling parameter, a parameter indicating the periodicity of the obtained aggregated data traffic, data traffic size, etc. Otherwise, if an existing bearer does exist that can carry the obtained aggregated periodical (or near periodical) traffic pattern then the CN node initiates a dedicated bearer modification process by sending a Modify Bearer Request message to the SGW. In a similar way as above, the Modify Bearer Request may comprise any information that is necessary, important, or otherwise suitable for modifying the existing bearer. Again, this information may e.g. include traffic shaping policy parameters such as a specific Quality of Service Class Identifier (QCI) parameter, a dedicated SPS scheduling parameter, a parameter indicating the periodicity of the obtained aggregated data traffic, etc.

Hereinafter, the message transmitted from the CN node to the SGW will be called Dedicated Bearer (DB) Request message. It should be appreciated that the DB Request may include either a request for a bearer creation or a request for a bearer modification. In other words, the DB Request may for example be a Create Bearer Request message or a Modify Bearer Request message.

Action 106

The SGW forwards, i.e. transmits, the DB Request message (that it received from the CN node) to the MME.

Action 107

The MME forwards, i.e. transmits, the DB Request message (that it received from the SGW) to the RAN node, i.e. the eNB in this example.

Action 108

The eNB receives the DB request message from the MME and establishes or modifies a dedicated bearer accordingly. Based on the DB request message from the MME, the eNB will know that the SPS should be used for scheduling radio resources for traffic over the bearer. The eNB, or a SPS scheduler of the eNB, may schedule data traffic in accordance with the information contained in the received DB request message from the MME. Or said differently, the eNB (or the SPS scheduler of the eNB) applies SPS for the obtained aggregated periodical (or near periodical) traffic pattern over a dedicated bearer. This way, physical layer control resource overhead may be reduced.

Actions 109, 110, 111

An Radio Access Bearer (RAB), such as an Enhanced RAB (E-RAB), response is transmitted from the eNB to the MME (action 109), from the MME to the SGW (action 110) and from the SGW to the CN node (action 111).

Figure 3:
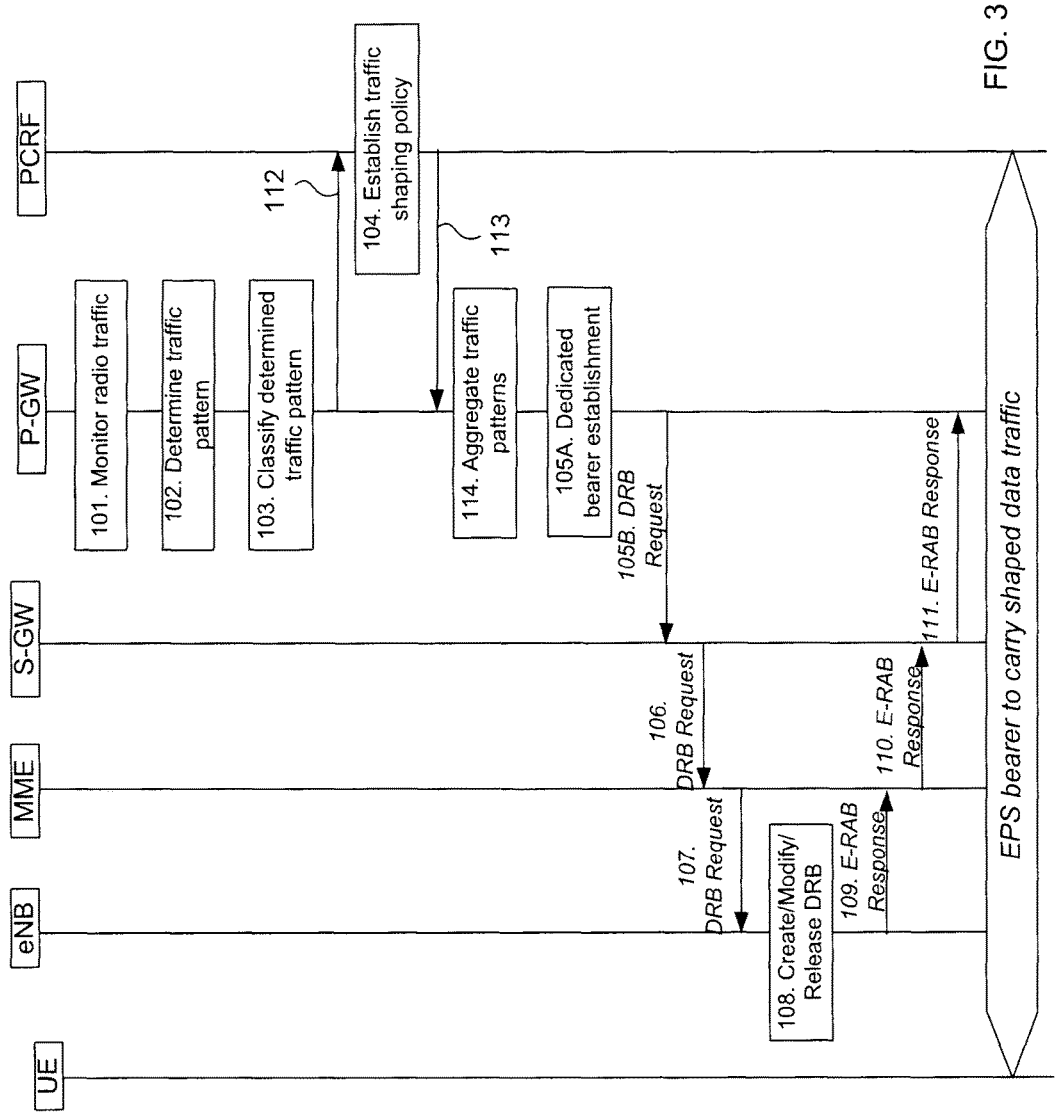
FIG. 3 shows an example signaling diagram of message sequences between various EPS nodes in accordance with another embodiment.

Turning now to FIG. 3, another embodiment will be described. FIG. 3 illustrates a distributed solution where two CN nodes are interacting. In this example embodiment, the two CN nodes are embodies as a PDN GW (or P-GW) and a PCRF node, respectively.

Action 101

The PDN GW node monitors data traffic pertaining to a UE. This action may, e.g., involve identifying data traffic related to one ore more applications (APPs) that are in use by the UE.

Action 102

The PDN GW detects or otherwise determines a traffic pattern for the UE based on the monitored data traffic. Thus, the detected traffic pattern is associated with the data traffic pertaining to the UE. In other words, the determined traffic pattern may be associated with identified data traffic that is related to the APP(s) that is/are in use by the UE.

This action may comprise analyzing whether identified data traffic related to the APPs exhibits a periodical or near periodical traffic pattern. Analyzing whether the data traffic related to the APPs exhibit a periodical or near periodical traffic pattern may in turn comprise analyzing the periodicity of the traffic exchange of the UE. The periodicity of traffic exchange may for example be defined as the data packet rate, e.g. the number of data packets transmitted and/or received by the UE in a particular number of seconds. Yet further, this action may comprise analyzing the packet size of the data packets transmitted and/or received by the UE. This action may thus also comprise analyzing an aggregated total data packet size transmitted and/or received by the UE. Moreover, this action may involve analyzing the number of small packets, i.e. the number of data packets having a packet size that is below a first pre-defined threshold size. Still further, this action may involve analyzing the distribution of packet sizes, i.e. the number of small packets compared with the number of large packets (wherein a large packet is defined as a data packet having a packet size that is above a second pre-defined threshold size).

In case both uplink (UL) and downlink (DL) traffic are analyzed in action 102, UL and DL traffic could be handled (thus, analyzed) separately.

Advantageously, but not necessarily, actions 101 and 102 described hereinabove may involve utilizing DPI. In other words, DPI may be utilized when identifying data traffic related to APPs in use by the UE and when analyzing whether identified data traffic related to the APPs exhibit a periodical or near periodical traffic pattern. DPI is, as such, known to persons skilled in the art and will therefore not be further detailed herein.

Action 103

The PDN GW classifies the determined traffic pattern into different categories based on the periodicity of the determined traffic pattern. For example, classifying the determined traffic pattern for the identified data traffic related to each of the APPs in use by the UE may be classified as one of periodical traffic pattern, near periodical traffic pattern or non-periodical traffic pattern.

In some embodiments, the PDN GW classifies the determined traffic pattern into different categories based on the earlier-mentioned data packet rate (e.g. the number of data packets transmitted and/or received by the UE in a particular number of seconds and/or packet size). In other words, depending on the determined data packet rate the determined traffic pattern may be classified as one of periodical traffic pattern, near periodical traffic pattern or non-periodical traffic pattern. Additionally, or alternatively, action 103 may involve classifying the determined traffic pattern into the different categories based one or more of the following: packet size, aggregated total packet size, distribution of packet sizes as described hereinabove with respect to action 102.

The inventors have realized that certain APPs, such as smartphone APPs, exhibit characteristics in terms of periodicity, packet size, aggregated total packet size, distribution of packet sizes, etc., that would mean that the traffic pattern of such APPs would be classified as either periodical, or near periodical, according to the embodiments described herein. In other words, these APPs would generally not be classified as non-periodical.

Action 112

When the determined traffic patterns has been classified as periodical or near periodical in action 103, a message is sent to PCRF node for requesting the PCRF node to establish a traffic shaping policy. Also, this message may e.g. comprise information about the APP(s) in use by the UE, such as the APP name, APP identity, determined traffic pattern associated with the APP(s) and the classification made in action 103.

Accordingly, the PCRF node also receives said message in action 112.

Action 104

The PCRF node establishes a traffic shaping policy based on the classification performed in action 103. As used herein, traffic shaping refers to the procedure of shaping traffic based on the determined traffic patters.

Action 104 advantageously comprises determining whether identified data traffic related to a first APP (e.g. APP A) in use by the UE is classified as periodical or near periodical traffic and also determining whether identified data traffic related to a second APP (e.g. APP B) in use by the UE is also classified as periodical or near periodical traffic.

The action of establishing the traffic shaping policy may also involve taking various parameters into account, such as Quality of Service parameters of the respective APPs (e.g., maximum delay, jitter tolerance). Thus, if necessary or appropriate, the data traffics of the various APPs may be adjusted or otherwise aligned such that it is made possible to obtain an aggregated periodical (or near periodical) traffic pattern.

Action 113

The PCRF transmits, i.e. sends, as response message to the PDN GW including any traffic shaping policy parameters for use by the PDN GW.

Action 114

Furthermore, when it has been determined by the PCRF node that both the identified data traffic related to said first APP (APP A) in use by the UE is classified as periodical or near periodical traffic and the identified data traffic related to said second APP (APP B) in use by the UE are classified as periodical or near periodical traffic, then the identified data traffics may be aggregated such that an aggregated periodical (or near periodical) traffic pattern (APP A+APP B) is obtained. Thus, periodic data traffic of APP A may be aggregated with periodic data traffic of APP B to obtain an aggregated period traffic of APPs A+B. By aggregating the data traffic of two (or more) APPs that all exhibit periodical, or near periodical, traffic pattern one single periodical, or near periodical, data traffic pattern may be obtained.

Action 105

In response to receiving the above-mentioned response message from the PCRF node, the PDN GW also initiates a dedicated bearer establishment 105A. The dedicated bearer establishment 105A typically comprises establishing a traffic mapping policy based on the received traffic shaping policy parameters. That is, the obtained aggregated periodical (or near periodical) traffic pattern of action 104 is mapped into a dedicated bearer. Thus, as used herein the term traffic mapping refers to the procedure of mapping the obtained aggregated periodical (or near periodical) traffic to a specific, or dedicated, bearer.

Initiating the dedicated bearer establishment may further comprise transmitting 105B a message comprising either a request for a bearer creation or a request for a bearer modification to a Serving Gateway (SGW). This message may carry the obtained aggregated periodical (or near periodical) traffic pattern. Said message may additionally comprise any information that is necessary, important, or otherwise suitable for the evolved Node B (eNB) when performing SPS. This information may e.g. include traffic shaping policy parameters such as a specific Quality of Service Class Identifier (QCI) parameter, a dedicated SPS scheduling parameter, a parameter indicating the periodicity of the obtained aggregated data traffic, data traffic size, etcetera.

Consequently, if no existing bearer exists that can carry the obtained aggregated periodical (or near periodical) traffic pattern then the CN node initiates a dedicated bearer creation process by sending a Create Bearer Request message to the SGW. The Create Bearer Request message may additionally comprise any information that is necessary, important, or otherwise suitable for creating the bearer. As described hereinabove, this information may e.g. include traffic shaping policy parameters such as a specific Quality of Service Class Identifier (QCI) parameter, a dedicated SPS scheduling parameter, a parameter indicating the periodicity of the obtained aggregated data traffic, data traffic size, etc. Otherwise, if an existing bearer does exist that can carry the obtained aggregated periodical (or near periodical) traffic pattern then the CN node initiates a dedicated bearer modification process by sending a Modify Bearer Request message to the SGW. In a similar way as above, the Modify Bearer Request may comprise any information that is necessary, important, or otherwise suitable for modifying the existing bearer. Again, this information may e.g. include traffic shaping policy parameters such as a specific Quality of Service Class Identifier (QCI) parameter, a dedicated SPS scheduling parameter, a parameter indicating the periodicity of the obtained aggregated data traffic, etc.

Hereinafter, the message transmitted from the CN node to the SGW will be called Dedicated Bearer (DB) Request message. It should be appreciated that the DB Request may include either a request for a bearer creation or a request for a bearer modification. In other words, the DB Request may for example be a Create Bearer Request message or a Modify Bearer Request message.

Action 106

The SGW forwards, i.e. transmits, the DB Request message (that it received from the CN node) to the MME.

Action 107

The MME forwards, i.e. transmits, the DB Request message (that it received from the SGW) to the RAN node, i.e. the eNB in this example.

Action 108

The eNB receives the DB request message from the MME and establishes or modifies a dedicated bearer accordingly. Based on the DB request message from the MME, the eNB will know that the SPS should be used for scheduling radio resources for traffic over the bearer. The eNB, or a SPS scheduler of the eNB, may schedule data traffic in accordance with the information contained in the received DB request message from the MME. Or said differently, the eNB (or the SPS scheduler of the eNB) applies SPS for the obtained aggregated periodical (or near periodical) traffic pattern over a dedicated bearer. This way, physical layer control resource overhead may be reduced.

Actions 109, 110, 111

A Radio Access Bearer (RAB), such as an Enhanced RAB (E-RAB), response is transmitted from the eNB to the MME (action 109), from the MME to the SGW (action 110) and from the SGW to the PDN GW (action 111).

The inventors have realized that many challenges associated with the introduction of emerging APPs, such as smartphone APPs, focus on the RAN side of the EPS. This is particularly true in current 3GPP discussions where most focus is to find proper solutions on the RAN side. For example, to resolve the potential radio control channel resource overhead issue associates with some APPs, Semi-Persistent Scheduling (SPS) has been introduced in LTE to reduce the radio control channel radio resource consuming. Currently, the SPS is e.g. enabled over radio interface for VoLTE (Voice over LTE) services. The inventors have realized that there exist scenarios where it is difficult, or even impossible, for an existing scheduler of the eNB to apply SPS when the data traffic originates form APPs having certain characteristics that are associated with emerging APPs, such as smartphone APPs. Thus, it has been further realized by the inventors that it may be a challenge for the scheduler of the eNB to identify the periodical (or near periodical) traffic pattern for certain emerging APPs to apply Semi Persistent Scheduling (SPS). Embodiments described hereinabove thus allow for assisting the RAN node in such SPS, i.e. when the data traffic originates from emerging APPs, such as smartphone APPs. By identifying and classifying data traffic as periodical or near periodical (thus, associated with typical data traffic characteristics of emerging APPs, such as smartphone APPs), one or several CN nodes may assist the RAN node (e.g. eNB) in its subsequent SPS. This subsequent SPS can then take the traffic pattern of these emerging APPs into account when performing SPS more efficiently.

With reference to FIGS. 4-9, various example embodiments of apparatuses will be described.

Figure 4:
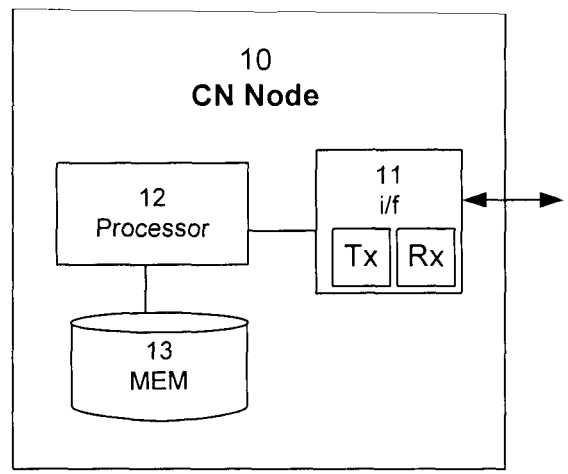
FIGS. 4 and 5 show various embodiments of a CN node.

FIG. 4 illustrates a CN node 10 which is configured to perform, or otherwise execute, the method described with respect to FIG. 2. The CN node comprises means 11, 12, 13 adapted to monitor data traffic pertaining to a UE, means 12, 13 adapted to determine a traffic pattern for the UE based on the monitored data traffic; means 12, 13 adapted to classify the determined traffic pattern into different categories based on the periodicity of the determined traffic pattern; means 12, 13 adapted to establish a traffic shaping policy for each category; and means 11, 12, 13 adapted to initiate a dedicated bearer establishment for enforcing the established traffic shaping policy. In one example implementation, the CN node 10 comprises a communications interface 11, a processor 12 and a memory 13. The communications interface 11 may comprise a transmitter (Tx) and a receiver (Rx). Alternatively, the communications interface 11 may comprise a single transceiver. The memory 13 may comprise instructions executable by the processor 12, whereby the CN node is operative to: monitor data traffic pertaining to a UE; determine a traffic pattern for the UE based on the monitored data traffic; classify the determined traffic pattern into different categories based on the periodicity of the determined traffic pattern; establish a traffic shaping policy for each category; and initiate a dedicated bearer establishment for enforcing the established traffic shaping policy.

The means 11, 12, 13 adapted to monitor data traffic pertaining to the UE may be further adapted to identify data traffic related to APPs in use by the UE. For example, memory 13 may comprise instructions executable by the processor 12, whereby the CN node 10 is operative to monitor data traffic pertaining to the UE may be further adapted to identify data traffic related to APPs in use by the UE.

The means 12, 13 adapted to determine the traffic pattern for the UE may be further adapted to analyze whether identified data traffic related to the APPs exhibit a periodical or a near periodical traffic pattern. For example, the memory 13 may comprise instructions executable by the processor 12, whereby the CN node 10 is operative to analyze whether identified data traffic related to the APPs exhibit a periodical or a near periodical traffic pattern.

The CN node 10 may also comprise means adapted to utilize DPI when identifying data traffic related to APPs in use by the UE and when analyzing whether identified data traffic related to the APPs exhibit a periodical or near periodical traffic pattern. For example, memory 13 may comprise instructions executable by the processor 12, whereby the CN node 10 is operative to utilize DPI when identifying data traffic related to APPs in use by the UE and when analyzing whether identified data traffic related to the APPs exhibit a periodical or near periodical traffic pattern.

The means 12, 13 adapted to classify the determined traffic pattern into different categories based on the periodicity of the determined traffic pattern is further adapted to classify the determined traffic pattern for the identified data traffic related to each of the APPs in use by the UE as one of periodical traffic pattern, near periodical traffic pattern or non-periodical traffic pattern. For example, the memory 13 may comprise instructions executable by the processor 12, whereby the CN node 10 is operative to classify the determined traffic pattern into different categories based on the periodicity of the determined traffic pattern is further adapted to classify the determined traffic pattern for the identified data traffic related to each of the APPs in use by the UE as one of periodical traffic pattern, near periodical traffic pattern or non-periodical traffic pattern.

The means 12, 13 adapted to establish the traffic shaping policy may be further adapted to: determine whether identified data traffic related to a first APP in use by the UE is classified as periodical or near periodical traffic; determine whether identified data traffic related to a second APP in use by the UE is also classified as periodical or near periodical traffic; and aggregate the identified data traffics to obtain an aggregated periodical traffic when it has been determined that both the identified data traffic related to said first APP in use by the UE is classified as periodical or near periodical traffic and the identified data traffic related to said second APP in use by the UE are classified as periodical or near periodical traffic. For example, the memory 13 may comprise instructions executable by the processor 12, whereby the CN node 10 is operative to establish the traffic shaping policy may be further adapted to: determine whether identified data traffic related to a first APP in use by the UE is classified as periodical or near periodical traffic; determine whether identified data traffic related to a second APP in use by the UE is also classified as periodical or near periodical traffic; and aggregate the identified data traffics to obtain an aggregated periodical traffic when it has been determined that both the identified data traffic related to said first APP in use by the UE is classified as periodical or near periodical traffic and the identified data traffic related to said second APP in use by the UE are classified as periodical or near periodical traffic.

The means adapted to initiate the dedicated bearer establishment for enforcing the established traffic shaping policy may be further adapted to transmit a message comprising either a request for a bearer creation or a request for a bearer modification to a SGW. For example, the memory 13 may comprise instructions executable by the processor 12, whereby the CN node 10 is operative to initiate the dedicated bearer establishment for enforcing the established traffic shaping policy may be further adapted to transmit a message comprising either a request for a bearer creation or a request for a bearer modification to a SGW.

Figure 5:
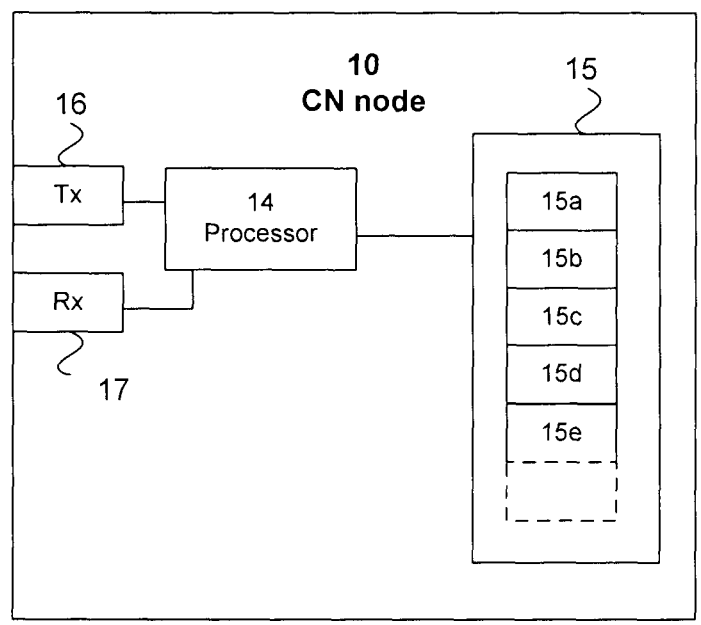

With reference to FIG. 5, an alternative embodiment of a CN node 10 will be briefly described. The CN node 10 may comprise a processor 14, various modules 15, a transmitter (Tx) 16 and a receiver (Rx) 17. The transmitter 16 and the receiver 17 may alternatively be implemented as a single transceiver. More particularly, the CN node 10 comprises a data traffic monitoring module 15a for monitoring data traffic pertaining to a UE. Also, a traffic pattern determination module 15b for determining a traffic pattern for the UE based on the monitored data traffic is provided. Furthermore, the various modules comprise a classification module 15c for classifying the determined traffic pattern into different categories based on the periodicity of the determined traffic pattern. Yet further, a traffic shaping policy establishment module 15d for establishing a traffic shaping policy for each category is provided. Furthermore, the various modules 15 comprise a bearer establishment module 15e for initiating a dedicated bearer establishment.

Figure 6:
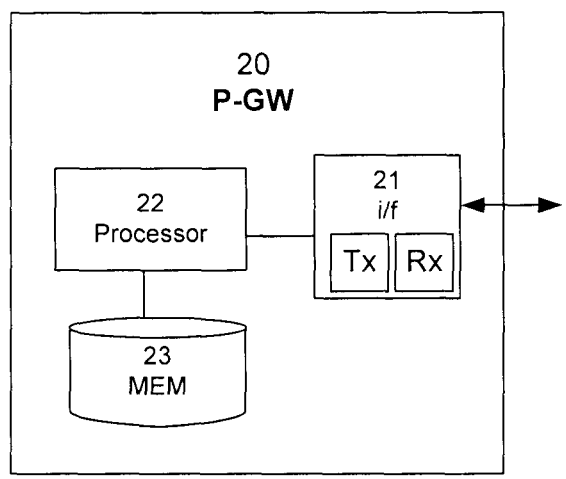
FIGS. 6 and 7 show various embodiments of a PDN GW.

FIG. 6 illustrates a PDN GW 20 which is configured to perform, or otherwise execute, the method described with respect to FIG. 3. The PDN GW comprises means 21, 22, 23 adapted to monitor data traffic pertaining to a UE, means 22, 23 adapted to determine a traffic pattern for the UE based on the monitored data traffic; means 22, 23 adapted to classify the determined traffic pattern into different categories based on the periodicity of the determined traffic pattern; means 21 adapted to transmit a message to a PCRF node for requesting the PCRF node to establish a traffic shaping policy when the determined traffic pattern is classified as periodical or near periodical traffic pattern; means 21 adapted to receive, from the PCRF node, a response message including traffic shaping policy parameters related to the established traffic shaping policy for use by the PDN GW 20; and means 21, 22, 23 adapted to initiate a dedicated bearer establishment for enforcing the traffic shaping policy established by the PCRF node by utilizing said traffic shaping policy parameters in response to receiving the response message including said traffic shaping policy parameters. In one example implementation, the PDN GW 20 comprises a communications interface 21, a processor 22 and a memory 23. The communications interface 21 may comprise a transmitter (Tx) and a receiver (Rx). Alternatively, the communications interface 21 may comprise a single transceiver. The memory 23 may comprise instructions executable by the processor 22, whereby the PDN GW is operative to: monitor data traffic pertaining to a UE; determining a traffic pattern for the UE based on the monitored data traffic; classify the determined traffic pattern into different categories based on the periodicity of the determined traffic pattern; when the determined traffic pattern is classified as periodical or near periodical traffic pattern transmit (by means of the communications interface 11) a message to a PCRF node for requesting the PCRF node to establish a traffic shaping policy; and receive (by means of the communications interface 11), from the PCRF node, a response message including traffic shaping policy parameters for use by the PDN GW; and, in response to receiving the response message including said traffic shaping policy parameters, initiate a dedicated bearer establishment for enforcing the traffic shaping policy established by the PCRF node by utilizing said traffic shaping policy parameters.

The means 21, 22, 23 adapted to monitor the data traffic pertaining to the UE may be further adapted to identify data traffic related to APPs in use by the UE. For example, the memory 23 may comprise instructions executable by the processor 22, whereby the PDN GW 20 is operative to identify data traffic related to APPs in use by the UE.

The means 22, 23 adapted to determine the traffic pattern for the UE may be further adapted to analyze whether identified data traffic related to the APPs exhibit a periodical or near periodical traffic pattern. For example, the memory 23 may comprise instructions executable by the processor 22, whereby the PDN GW 20 is operative to analyze whether identified data traffic related to the APPs exhibit a periodical or near periodical traffic pattern.

The PDN GW may further comprise means adapted to utilize DPI when identifying data traffic related to APPs in use by the UE and when analyzing whether identified data traffic related to the APPs exhibit a periodical or near periodical traffic pattern. For example, the memory 23 may comprise instructions executable by the processor 22, whereby the PDN GW 20 is operative to utilize DPI when identifying data traffic related to APPs in use by the UE and when analyzing whether identified data traffic related to the APPs exhibit a periodical or near periodical traffic pattern.

The means 22, 23 adapted to classify the determined traffic pattern into different categories based on the periodicity of the determined traffic pattern may be further adapted to classify the determined traffic pattern for the identified data traffic related to each of the APPs in use by the UE as one of periodical traffic pattern, near periodical traffic pattern or non-periodical traffic pattern. In one example implementation, the memory 23 may comprise instructions executable by the processor 22, whereby the PDN GW 20 is operative to classify the determined traffic pattern into different categories based on the periodicity of the determined traffic pattern may be further adapted to classify the determined traffic pattern for the identified data traffic related to each of the APPs in use by the UE as one of periodical traffic pattern, near periodical traffic pattern or non-periodical traffic pattern.

In one embodiment, the PDN GW 20 comprises means adapted to aggregate (or, synchronize) identified data traffics into a same periodical traffic pattern when it has been determined by the PCRF node that both the identified data traffic related to a first APP in use by the UE is classified as periodical or near periodical traffic and the identified data traffic related to a second APP in use by the UE are classified as periodical or near periodical traffic. For instance, the memory 23 may comprise instructions executable by the processor 22, whereby the PDN GW 20 is operative to aggregate identified data traffics into a same periodical traffic pattern when it has been determined by the PCRF node that both the identified data traffic related to a first APP in use by the UE is classified as periodical or near periodical traffic and the identified data traffic related to a second APP in use by the UE are classified as periodical or near periodical traffic.

In some embodiments, the means 21, 22, 23 adapted to initiate a dedicated bearer establishment for enforcing the established traffic shaping policy may be further adapted to transmit a message comprising either a request for a bearer creation or a request for a bearer modification to a SGW. For example, the memory 23 may comprise instructions executable by the processor 22, whereby the PDN GW 20 is operative to initiate a dedicated bearer establishment for enforcing the established traffic shaping policy may be further adapted to transmit a message comprising either a request for a bearer creation or a request for a bearer modification to a SGW.

Figure 7:
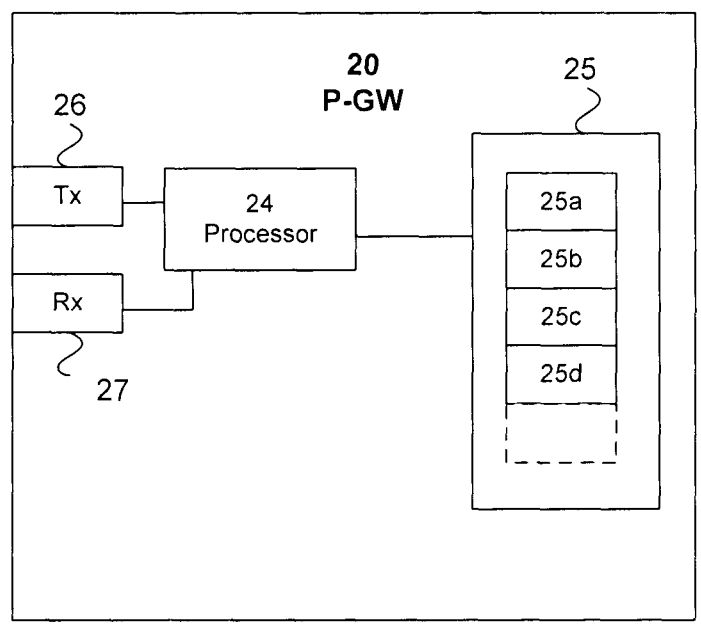

With reference to FIG. 7, an alternative embodiment of a PDN GW 20 will be briefly described. The PDN GW may comprise a processor 24, various modules 25, a transmitter (Tx) 26 and a receiver (Rx) 27. The transmitter 26 and the receiver 27 may alternatively be implemented as a single transceiver. More particularly, the PDN GW 20 comprises a data traffic monitoring module 25a for monitoring data traffic pertaining to a UE. The PDN GW 20 also comprises a traffic pattern determination module 25b for determining a traffic pattern for the UE based on the monitored data traffic. Also, a traffic pattern classification module 25c is provided for classifying the determined traffic pattern into different categories based on the periodicity of the determined traffic pattern. Moreover, the transmitter 26 may be configured to transmit, i.e. send, a message to a PCRF node for requesting the PCRF node to establish a traffic shaping policy. This may generally be done in response to the determined traffic pattern having been classified as a periodical or a near periodical traffic pattern. Furthermore, the receiver 27 may be configured to receive, from the PCRF node, a response message including traffic shaping policy parameters for use by the PDN GW. Still further, a bearer establishment module 25d is provided for initiating a dedicated bearer establishment in response to receiving said response message including said traffic shaping policy parameters. Thus, the traffic shaping policy established by the PCRF node may be enforced by the PDN GW 20.

Figure 8:
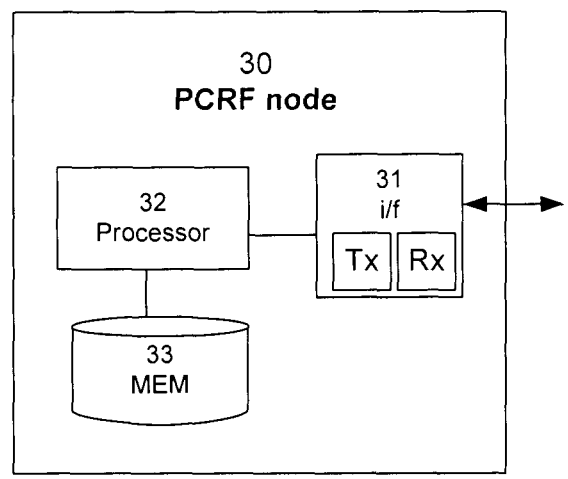
FIGS. 8 and 9 show various embodiments of a PCRF node.

FIG. 8 illustrates a PCRF node 30 which is configured to perform, or otherwise execute, the method described with respect to FIG. 3. The PCRF node 30 comprises means 31 adapted to receive a message from a PDN GW requesting the PCRF node to establish a traffic shaping policy; means 22, 23 adapted to establish a traffic shaping policy in response to receiving said message from the PDN GW; and means 31 adapted to transmit, to the PDN GW, a response message including traffic shaping policy parameters related to the established traffic shaping policy to be used by the PDN GW. In one example implementation, the PCRF node 30 comprises a communications interface 31, a processor 32 and a memory 33. The communications interface 31 may comprise a transmitter (Tx) and a receiver (Rx). Alternatively, the communications interface 31 may comprise a single transceiver. The memory 33 may comprise instructions executable by the processor 32, whereby the PCRF node is operative to: receive a message from a PDN GW requesting the PCRF node to establish a traffic shaping policy; establish a traffic shaping policy in response to receiving said message from the PDN GW; and transmit, to the PDN GW, a response message including traffic shaping policy parameters related to the established traffic shaping policy.

In some embodiments, the means 32, 33 adapted to establish the traffic shaping policy may be further adapted to determine whether identified data traffic related to a first APP in use by the UE is classified as periodical or near periodical traffic; and determine whether identified data traffic related to a second APP in use by the UE is also classified as periodical or near periodical traffic. For instance, the memory 33 may comprise instructions executable by the processor 32, whereby the PCRF node is operative to establish the traffic shaping policy may be further adapted to determine whether identified data traffic related to a first APP in use by the UE is classified as periodical or near periodical traffic; and determine whether identified data traffic related to a second APP in use by the UE is also classified as periodical or near periodical traffic.

Figure 9:
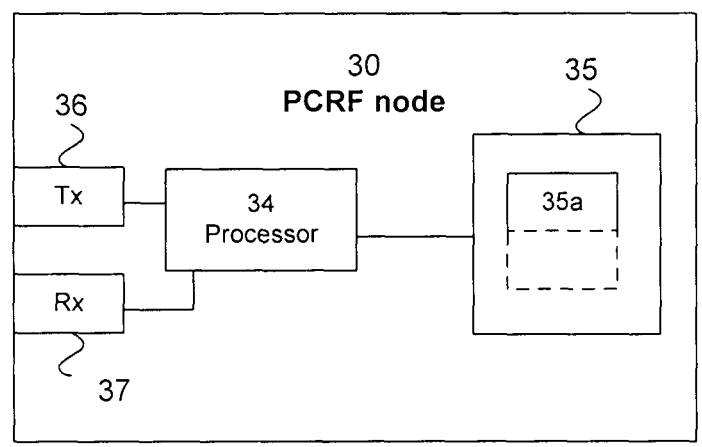

With reference to FIG. 9, an alternative embodiment of a PCRF node 30 will be briefly described. The PCRF node 30 may comprise a processor 34, one or more modules 35, a transmitter (Tx) 36 and a receiver (Rx) 37. The transmitter 36 and the receiver 37 may alternatively be implemented as a single transceiver. More particularly, the receiver 37 may be configured to receive a message from a PDN GW requesting the PCRF node to establish a traffic shaping policy. Also, traffic shaping policy establishment module 35a for establishing a traffic shaping policy in response to receiving said message from the PDN GW may be provided. Furthermore, the transmitter 36 may be configured to transmit, to the PDN GW, a response message including traffic shaping policy parameters related to the established traffic shaping policy for subsequent use by the PDN GW.

Figure 10:
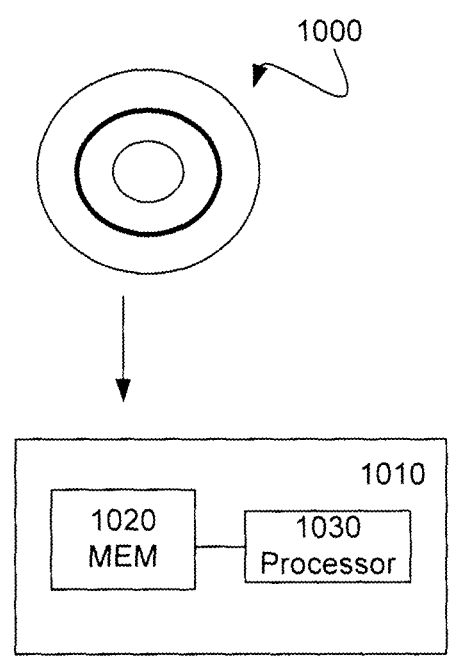
FIG. 10 shows an example embodiment in the form of a computer program.

Turning now to FIG. 10, yet another embodiment is disclosed. FIG. 10 illustrates a computer program comprising instructions which, when executed on at least one processor 1030 of at least one apparatus 1010, will cause the at least one apparatus 1010 to: monitor data traffic pertaining to a UE; determine a traffic pattern for the UE based on the monitored data traffic; classify the determined traffic pattern into different categories based on the periodicity of the determined traffic pattern; establish a traffic shaping policy for each category; and initiate a dedicated bearer establishment for enforcing the established traffic shaping policy. A carrier may comprise the above-mentioned computer program. The carrier may be a computer readable storage medium 1000. Alternatively, the carrier may be one of an electronic signal, an optical signal, or a radio signal. In some embodiments, the at least one apparatus 1210 may be embodied as one or several CN nodes.

As has been described earlier, by identifying and classifying data traffic as periodical or near periodical (thus, associated with typical data traffic characteristics of emerging APPs, such as smartphone APPs), one or several CN nodes may assist a RAN node (e.g. eNB) in its subsequent SPS. This subsequent SPS can then take the traffic pattern of these emerging APPs into account when performing SPS more efficiently. Embodiments described herein thus provide the advantage that they may enable radio communication networks to support emerging APPs.

In the detailed description hereinabove, for purposes of explanation and not limitation, specific details are set forth such as particular architectures, interfaces, techniques, etc. in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein may represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. For example, while the embodiments described herein have been described with respect to an EPS system, persons skilled in the art will understand that modifications and other variants of the described embodiments may be applied in other systems such as e.g. WCDMA, etc. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method, performed by a Core Network (CN) node, for assisting a Radio Access Network node (RAN) node in performing a Semi Persistent Scheduling (SPS), the method comprising:
   monitoring data traffic pertaining to a User Equipment (UE);
   determining a traffic pattern for the UE based on the monitored data traffic;

classifying the determined traffic pattern into different categories based on a periodicity of the determined traffic pattern, wherein the classifying the determined traffic pattern into different categories based on the periodicity of the determined traffic pattern comprises classifying the determined traffic pattern by identifying data traffic related to each of a plurality of applications (APPs) in use by the UE as one of: a periodical traffic pattern, a near periodical traffic pattern, and a non-periodical traffic pattern;

establishing a traffic shaping policy for the categories; and initiating a dedicated bearer establishment for enforcing the established traffic shaping policy.

2. The method of claim 1, wherein determining the traffic pattern for the UE comprises analyzing whether identified data traffic related to the APPs exhibit a periodical or near periodical traffic pattern.

3. The method of claim 2:

wherein the identifying data traffic related to APPs in use by the UE comprises utilizing Deep Packet Inspection;

wherein the analyzing whether identified data traffic related to the APPs exhibit a periodical or near periodical traffic pattern comprises utilizing Deep Packet Inspection.

4. The method of claim 1, wherein the establishing the traffic shaping policy comprises:

determining whether identified data traffic related to a first APP in use by the UE is classified as periodical or near periodical traffic;

determining whether identified data traffic related to a second APP in use by the UE is also classified as periodical or near periodical traffic; and aggregating the identified data traffics to obtain an aggregated periodical traffic pattern when it has been determined that both the identified data traffic related to said first APP in use by the UE is classified as periodical or near periodical traffic and the identified data traffic related to said second APP in use by the UE are classified as periodical or near periodical traffic.

5. The method of claim 1, wherein the initiating a dedicated bearer establishment for enforcing the established traffic shaping policy comprises transmitting a message comprising either a request for a bearer creation or a request for a bearer modification to a Serving Gateway.

6. A Core Network (CN) node for assisting a Radio Access Network (RAN) node in performing a Semi Persistent Scheduling (SPS), the CN node comprising:

a processor;

memory containing instructions executable by the processor whereby the CN node is operative to:

monitor data traffic pertaining to a User Equipment, UE;

determine a traffic pattern for the UE based on the monitored data traffic;

classify the determined traffic pattern into different categories based on a periodicity of the determined traffic pattern;

establish a traffic shaping policy for the categories; and initiate a dedicated bearer establishment for enforcing the established traffic shaping policy;

wherein the instructions are such that the CN node is further operative to classify the determined traffic pattern by identifying data traffic related to each of a plurality of applications (APPs) in use by the UE as one of: a periodical traffic pattern, a near periodical traffic pattern, and a non-periodical traffic pattern.

7. The CN node of claim 6, wherein the instructions are such that the CN node is operative to analyze whether identified data traffic related to the APPs exhibit a periodical or a near periodical traffic pattern.

8. The CN node of claim 7, wherein the instructions are such that the CN node is operative to utilize Deep Packet Inspection (DPI) when identifying data traffic related to APPs in use by the UE and when analyzing whether identified data traffic related to the APPs exhibit a periodical or near periodical traffic pattern.

9. The CN node of claim 6, wherein the instructions are such that the CN node is operative to:

determine whether identified data traffic related to a first APP in use by the UE is classified as periodical or near periodical traffic;

determine whether identified data traffic related to a second APP in use by the UE is also classified as periodical or near periodical traffic; and aggregate the identified data traffics to obtain an aggregated periodical traffic when it has been determined that both the identified data traffic related to said first APP in use by the UE is classified as periodical or near periodical traffic and the identified data traffic related to said second APP in use by the UE are classified as periodical or near periodical traffic.

10. The CN node of claim 6, wherein the instructions are such that the CN node is operative to transmit a message comprising either a request for a bearer creation or a request for a bearer modification to a Serving Gateway.

11. A method, performed by a Packet Data Network Gateway (PDN GW), for assisting a Radio Access Network (RAN) node in performing a Semi Persistent Scheduling (SPS), the method comprising:

monitoring data traffic pertaining to a User Equipment (UE);

determining a traffic pattern for the UE based on the monitored data traffic;

classifying the determined traffic pattern into different categories based on a periodicity of the determined traffic pattern;

transmitting, in response to the determined traffic pattern being classified as a periodical traffic pattern or a near periodical traffic pattern, a message to a Policy and Charging Rules Function (PCRF) node for requesting the PCRF node to establish a traffic shaping policy;

receiving, from the PCRF node, a response message including traffic shaping policy parameters for use by the PDN GW; and in response to receiving the response message including said traffic shaping policy parameters, initiating a dedicated bearer establishment for enforcing the traffic shaping policy established by the PCRF node by utilizing the traffic shaping policy parameters.

12. The method of claim 11, wherein monitoring the data traffic pertaining to the UE comprises identifying data traffic related to applications (APPs) in use by the UE.

13. The method of claim 12, wherein determining the traffic pattern for the UE comprises analyzing whether identified data traffic related to the APPs exhibit a periodical traffic pattern or a near periodical traffic pattern.

14. The method of claim 13:

wherein the identifying data traffic related to APPs in use by the US comprises utilizing Deep Packet Inspection (DPI);

wherein the analyzing whether identified data traffic related to the APPs exhibit a periodical traffic pattern or a near periodical traffic pattern comprises utilizing DPI.

15. The method of claim 12, wherein the classifying the determined traffic pattern into different categories based on the periodicity of the determined traffic pattern comprises classifying the determined traffic pattern for the identified data traffic related to each of the APPs in use by the UE as one of: a periodical traffic pattern, a near periodical traffic pattern, and a non-periodical traffic pattern.

16. The method of claim 15, further comprising aggregating identified data traffics to obtain an aggregated periodical traffic in response to the PCRF node determining that both the identified data traffic related to a first APP in use by the UE is classified as a periodical traffic pattern or a near periodical traffic pattern and the identified data traffic related to a second APP in use by the UE are classified as a periodical traffic pattern or a near periodical traffic pattern.

17. The method of claim 11, wherein the initiating a dedicated bearer establishment for enforcing the established traffic shaping policy comprises transmitting a message comprising either a request for a bearer creation or a request for a bearer modification to a Serving Gateway.

18. A Packet Data Network Gateway (PDN GVV) for assisting a Radio Access Network (RAN) node in performing a Semi Persistent Scheduling (SPS), the PDN GW comprising:
a processor;
memory containing instructions executable by the processor whereby the PDN GW is operative to:
monitor data traffic pertaining to a User Equipment (UE);
determine a traffic pattern for the UE based on the monitored data traffic;
classify the determined traffic pattern into different categories based on a periodicity of the determined traffic pattern;
transmit a message to a Policy and Charging Rules Function (PCRF) node for requesting the PCRF node to establish a traffic shaping policy when the determined traffic pattern is classified as a periodical traffic pattern or a near periodical traffic pattern;
receive, from the PCRF node, a response message including traffic shaping policy parameters related to the established traffic shaping policy for use by the PDN GW; and
initiate, in response to receiving the response message including the traffic shaping policy parameters, a dedicated bearer establishment for enforcing the established traffic shaping policy established by the PCRF node.

19. The PDN GW of claim 18, wherein the instructions are such that the PDN GW is operative to identify data traffic related to applications (APPs) in use by the UE.

20. The PDN GW of claim 19, wherein the instructions are such that the PDN GW is operative to analyze whether identified data traffic related to the APPs exhibit a periodical traffic pattern or a near periodical traffic pattern.

21. The PDN GW of claim 20, wherein the instructions are such that the PDN GW is operative to utilize Deep Packet Inspection (DPI) when identifying data traffic related to APPs in use by the UE and when analyzing whether identified data traffic related to the APPs exhibit a periodical traffic pattern or a near periodical traffic pattern.

22. The PDN GW of claim 19, wherein the instructions are such that the PDN GW is operative to classify the determined traffic pattern for the identified data traffic related to each of the APPs in use by the UE as one of: a periodical traffic pattern, a near periodical traffic pattern, and a non-periodical traffic pattern.

23. The PDN GW of claim 22, wherein the instructions are such that the PDN GW is operative to aggregate identified data traffics into a same periodical traffic in response to determining that both the identified data traffic related to a first APP in use by the UE is classified as a periodical traffic pattern or a near periodical traffic pattern and the identified data traffic related to a second APP in use by the UE are classified as a periodical traffic pattern or a near periodical traffic pattern.

24. The PDN GW of claim 18, wherein the instructions are such that the PDN GW is operative to transmit a message comprising either a request for a bearer creation or a request for a bearer modification to a Serving Gateway.

25. A method performed by a Policy and Charging Rules Function (PCRF) node, for assisting a Radio Access Network (RAN) node in performing a Semi Persistent Scheduling (SPS), the method comprising:
receiving a message from a Packet Data Network Gateway (PDN GVV) requesting the PCRF node to establish a traffic shaping policy;
establishing a traffic shaping policy in response to receiving the message from the PDN GW, wherein the establishing of the traffic shaping policy comprises:
determining whether identified data traffic related to a first application (APP) in use by a User Equipment (UE) is classified as periodical or near periodical traffic; and
determining whether identified data traffic related to a second APP in use by the UE is also classified as periodical or near periodical traffic; and
transmitting, to the PDN GW, a response message including traffic shaping policy parameters related to the established traffic shaping policy for subsequent use by the PDN GW.

26. A Policy and Charging Rules Function (PCRF) node for assisting a Radio Access Network (RAN) node in performing a Semi Persistent Scheduling (SPS), the PCRF node comprising:
a processor;
memory containing instructions executable by the processor whereby the PCRF node is operative to:
receive a message from a Packet Data Network Gateway (PDN GVV) requesting the PCRF node to establish a traffic shaping policy;
establish a traffic shaping policy in response to receiving said message from the PDN GW;
determine whether identified data traffic related to a first application (APP) in use by a User Equipment (UE) is classified as periodical or near periodical traffic; and
determine whether identified data traffic related to a second APP in use by the UE is also classified as periodical or near periodical traffic; and
transmit, to the PDN GW, a response message including traffic shaping policy parameters related to the established traffic shaping policy for subsequent use by the PDN GW.

27. A computer program product stored in a non-transitory computer readable medium for controlling an apparatus, the computer program product comprising software instructions which, when run on at least one processor of the apparatus, causes the apparatus to:
monitor data traffic pertaining to a User Equipment (UE);
determine a traffic pattern for the UE based on the monitored data traffic;
classify the determined traffic pattern into different categories based on a periodicity of the determined traffic pattern, wherein to classify the determined traffic pattern into different categories based on the periodicity of the determined traffic pattern, the apparatus is caused to classify the determined traffic pattern by identifying data traffic related to each of a plurality of applications (APPs) in use by the UE as one of: a periodical traffic pattern, a near periodical traffic pattern, and a non-periodical traffic pattern;

establish a traffic shaping policy for the categories; and initiate a dedicated bearer establishment for enforcing the established traffic shaping policy.

\* \* \* \* \*